(12) United States Patent
Tione

(10) Patent No.: US 12,157,452 B2
(45) Date of Patent: Dec. 3, 2024

(54) ELECTROMECHANICAL SERVICE AND EMERGENCY BRAKING ACTUATOR FOR A RAILWAY VEHICLE AND ELECTROMECHANICAL BRAKING SYSTEM

(71) Applicant: FAIVELEY TRANSPORT ITALIA S.P.A., Turin (IT)

(72) Inventor: Roberto Tione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 169 days.

(21) Appl. No.: 17/907,242

(22) PCT Filed: Apr. 2, 2021

(86) PCT No.: PCT/IB2021/052764
§ 371 (c)(1),
(2) Date: Sep. 23, 2022

(87) PCT Pub. No.: WO2021/198994
PCT Pub. Date: Oct. 7, 2021

(65) Prior Publication Data
US 2023/0106350 A1    Apr. 6, 2023

(30) Foreign Application Priority Data
Apr. 2, 2020   (IT) .................. 102020000007003

(51) Int. Cl.
*B60T 8/17*    (2006.01)
*B60T 8/171*   (2006.01)
(Continued)

(52) U.S. Cl.
CPC ............ *B60T 8/1705* (2013.01); *B60T 8/171* (2013.01); *B60T 8/172* (2013.01); *B60T 8/1893* (2013.01); *B60T 13/746* (2013.01); *B60T 17/228* (2013.01)

(58) Field of Classification Search
CPC ........ B60T 8/1705; B60T 8/171; B60T 8/172; B60T 8/1893; B60T 13/746; B60T 17/228
See application file for complete search history.

(56) References Cited

U.S. PATENT DOCUMENTS 5,735,579 A *  4/1998  Wood .................... B60T 8/3235
                                                                303/7
6,666,528 B1 * 12/2003  Gayfer .................. B60T 8/1818
                                                                303/9.69
(Continued)

FOREIGN PATENT DOCUMENTS

CN        110758358 A     2/2020
DE    102017102021 A1     8/2018
(Continued)

OTHER PUBLICATIONS

ISA European Patent Office, International Search Report Issued in Application No. PCT/IB2021/052764, Sep. 2, 2021, WIPO, 3 pages.

*Primary Examiner* — George C Jin
(74) *Attorney, Agent, or Firm* — K&L Gates, LLP

(57) ABSTRACT

An electromechanical service and emergency braking actuator for a railway vehicle is described, comprising a safety unit arranged to regulate a first emergency braking control signal so as to indicate to first emergency braking energy release means to release the energy stored in first emergency braking energy storage means when an emergency braking request signal indicates a request for an emergency braking and a first electrical signal of actual braking force does not indicate, within a predetermined maximum delay time, a force value coinciding with a further emergency braking (Continued)

force value calculated by said safety unit or a force value that does not fall, within a predetermined maximum delay time, in a predetermined tolerance range including the additional emergency braking force value calculated by said safety unit. Electromechanical braking systems are also described.

20 Claims, 7 Drawing Sheets

(51) Int. Cl.
  *B60T 8/172* (2006.01)
  *B60T 8/18* (2006.01)
  *B60T 13/74* (2006.01)
  *B60T 17/22* (2006.01)

(56) References Cited

U.S. PATENT DOCUMENTS

| | | | |
|---|---|---|---|
| 2004/0069055 | A1 | 4/2004 | Staltmeir et al. |
| 2018/0257623 | A1* | 9/2018 | Herden ................. B60T 13/665 |
| 2018/0273003 | A1* | 9/2018 | Aurich .................. B60T 8/1705 |
| 2018/0326954 | A1* | 11/2018 | Ueno ..................... B60T 8/171 |
| 2019/0217838 | A1* | 7/2019 | Grasso ................. B60T 13/665 |

FOREIGN PATENT DOCUMENTS

| | | | |
|---|---|---|---|
| EP | 0166156 | A1 | 1/1986 |
| WO | 2011036003 | A2 | 3/2011 |
| WO | 2014079490 | A1 | 5/2014 |
| WO | 2019207372 | A1 | 10/2019 |

* cited by examiner

ELECTROMECHANICAL SERVICE AND EMERGENCY BRAKING ACTUATOR FOR A RAILWAY VEHICLE AND ELECTROMECHANICAL BRAKING SYSTEM

CROSS REFERENCE TO RELATED APPLICATIONS

The present application is a U.S. National Phase of International Application No. PCT/IB2021/052764 entitled "ELECTROMECHANICAL SERVICE AND EMERGENCY BRAKING ACTUATOR FOR A RAILWAY VEHICLE AND ELECTROMECHANICAL BRAKING SYSTEM," and filed on Apr. 2, 2021. International Application No. PCT/IB2021/052764 claims priority to Italian Patent Application No. 102020000007003 filed on Apr. 2, 2020. The entire contents of each of the above-listed applications are hereby incorporated by reference for all purposes.

TECHNICAL FIELD

This invention is generally in the sector of railway braking systems; in particular, the invention relates to an electromechanical service and emergency braking actuator for a railway vehicle.

PRIOR ART

In the following description, reference will be made to the following European standards, EN50129:rev.2018, EN50159:rev.2010, EN50126-1:rev.2017, EN50126-2:rev.2017, EN50128:rev.2011, where:

EN50126 ["Railway applications. The specification and demonstration of reliability, availability, maintainability and safety (RAMS)];

EN50128 ["Railway applications. Communications, signaling and processing systems. Software for railway control and protection systems"];

EN50129 ["Railway applications. Communication, signaling and processing systems. Safety-related electronic systems for signaling"];

EN50159 ["Railway applications. Communication, signaling and processing systems. Safety-related communication in transmission systems"].

In particular, standard EN50126 defines the methodologies for assigning the safety levels SIL0/1/2/3/4 (with safety level SIL4 indicating the maximum safety level) to the subsystems making up the system in question, based on the results of the Safety Analysis, and standards EN50128 and EN50129 define the design criteria to be applied to the software and hardware components respectively on the basis of the SIL levels assigned based on said Safety Analysis results.

It is known in the art that:

the safety calculations relating to the emergency braking function carried out according to European standard EN50126 systematically assign a Safety Integrity Level SIL≥3 to said emergency braking function, and consequently normally to the subsystems that implement them;

the safety calculations relating to the service braking function carried out in accordance with European standard EN50126 normally assign a Safety Integrity Level SIL≤2 to said service braking function, and consequently normally to the subsystems that implement them;

the development of a control unit, typically microprocessor-based or FPGA-based, according to safety integrity levels SIL≥3 in accordance with EN50128 and EN50129, involves design, validation, and certification costs that are approximately an order of magnitude higher than design according to SIL≤2 safety integrity levels.

In relation to the last of the preceding points, it is clear that it is worthwhile to keep the functions to be developed according to the SIL≥3 safety levels extremely limited and simple.

A generic pneumatic braking system for railway applications, particularly for passenger trains, is shown in FIG. 1.

A system for the generation and filtration of compressed air 101 feeds a main duct 102, arranged to supply compressed air to the braking systems and the suspension systems along the train, the compressed air being supplied in a range of values commonly between 6 bar and 10 bar.

Through a non-return valve 103 the main pipeline feeds an auxiliary tank 104, an electro-pneumatic module 105, a pneumatic weighing valve 106, and a relay valve 107.

The object of the auxiliary tank 104 is to store a quantity of compressed air so as to ensure at least one emergency braking in the event of a sudden loss of pressure in the main line 102.

The object of the non-return valve 103 is to prevent the loss of air from the auxiliary tank 104 to the main line 102 in the event of a sudden loss of pressure to said main line 102.

The electro-pneumatic module 105, the embodiment of which is prior art, is controlled by a control unit 108 by means of an electrical signal group 109.

The control unit 108 is an electronic unit.

The control unit 108 receives a service braking request through an electrical signal 109, the nature of which may be, but is not limited to, an analog signal or a serial communication channel.

Furthermore, the electronic control unit 108 receives a signal 110 indicative of the weight on the bogie or on the body to be braked.

The electronic control unit 108 calculates the service braking pressure according to the braking request 109 and the value assumed by the signal 110 indicative of the weight on the bogie or body to be braked and controls the electro-pneumatic module 105 to bring the service braking pressure at the outlet 111 of the electro-pneumatic module 105 to the calculated value.

The outlet 111 of the electro-pneumatic module 105 is connected to one of the two inlets of a double stop valve 112.

A pneumatic weighing valve 106 receives a pneumatic signal 113 indicative of the pressure present at the pneumatic suspensions associated with the bogie or vehicle to be braked, i.e., indicative of the weight bearing on said bogie or vehicle.

The pneumatic weighing valve 106 is designed to continuously generate at its outlet 114 a pressure for emergency braking, the value of which continuously corresponds to the pressure value required to produce a predetermined nominal emergency deceleration, defined in the design stage, in any weight condition associated with the pneumatic signal 113.

The outlet 114 of the pneumatic weighing valve 106 supplies an emergency pneumatic solenoid valve 116 controlled by an electrical emergency braking request signal 115, said emergency pneumatic solenoid valve 116 being arranged to assume a first state wherein it prevents the propagation of the emergency braking pressure at its outlet 117 when the electrical emergency braking request signal 115 is in a first state wherein emergency braking is not requested, said emergency pneumatic solenoid valve 116 being arranged to assume a second state wherein it allows the propagation of the emergency braking pressure at its outlet 117 when the electrical emergency braking request signal 115 is in a second state wherein it requests emergency braking.

The outlet 117 of the emergency pneumatic solenoid valve 116 is connected to the second inlet of the double stop valve 112, through a calibrated orifice 118.

The outlet of the double stop valve 112 is connected to the pilot chamber of the relay valve 101.

The outlet 119 of the relay valve 107 supplies the at least one braking cylinder 120 associated with the bogie or body to be braked.

When the signal 115 does not indicate an emergency braking request, the pressure at the outlet 117 of the emergency pneumatic solenoid valve 116 assumes the nominal value 0 bar.

Thus, when the signal 115 does not indicate an emergency braking request, the pressure at the outlet of the double stop valve 112 always coincides with the service braking pressure at the outlet 111 of the electro-pneumatic module 105, i.e., the pressure in the pilot chamber of the relay valve 107 always coincides with the service braking pressure at the outlet 111 of the electro-pneumatic module 105, i.e., the pressure at the at least one brake cylinder 120 corresponds to the service braking pressure.

When the signal 115 indicates an emergency braking request, the pressure at the outlet 117 of the emergency pneumatic solenoid valve 116 assumes the nominal value of the emergency braking pressure generated by the pneumatic weighing valve 106.

In this condition, the pressure at the outlet of the double stop valve 112 coincides with the greater of the service braking pressure and the emergency braking pressure.

It is known that the emergency braking pressure is normally equal to or greater than the service braking pressure in any weight condition.

For this reason, the pressure at the outlet of the double stop valve 112 coincides with the emergency braking pressure when the electrical emergency signal 115 requires emergency braking.

The calibrated orifice 118 performs the function of limiting the rise gradient of the emergency braking pressure at a predefined value in the design stage in order to limit the risk of passengers falling during the application of an emergency braking.

It is known that the integration of the pneumatic weighing valve 106, the emergency pneumatic solenoid valve 116, the double stop valve 112, and the relay valve 107 reaches a safety integrity level SIL≥3, as required by the EN50126 standard.

New electromechanical braking systems for railway applications, based on mechatronic technology, are being developed. Their design must functionally replicate that which was previously described for a generic electro-pneumatic brake for railway applications, especially with regard to safety-related functions.

It is therefore necessary to ensure that:
an amount of energy is stored in the system to ensure at least one emergency braking the emergency braking force applied to the wheels always conforms to a predetermined deceleration value, and thus conforms to the instantaneous weight on the braking wheels the emergency braking force is applied according to a maximum gradient such as to limit the risk of passengers falling during the application of an emergency braking the emergency braking at the whole train level reaches a safety integrity level SIL=4.

FIG. 2 is a first non-exclusive example of a functional diagram of an electromechanical braking actuator 200 according to the prior art.

A first electromechanical module 201 comprising at least one electric motor and possibly a speed reducer, i.e., torque multiplier, may extend or retract an arm 206 connected to an emergency braking module 207.

The emergency braking module 207 comprises emergency braking energy storage means 208, for example, a potential mechanical energy storage means, the mechanical means for storing potential mechanical energy being by way of non-exclusive example a helical spring. The emergency braking module 207 further comprises emergency braking energy release means 209, for example an electromechanical retention mechanism, controlled by an emergency braking request signal 210. The emergency braking energy release means 209 are arranged to have a first state wherein they maintain the potential mechanical energy previously stored in the emergency braking energy storage means 208 when the emergency braking request signal 210 does not indicate a request for emergency braking. The emergency braking energy release means 209 are arranged to have a second state wherein they release the potential mechanical energy previously stored in the emergency braking energy storage means 208 when the emergency braking request signal 210 indicates a request for emergency braking.

Other forms of mechanical energy storage may be used, such as, by way of non-exclusive example, a spring of the flat spiral type in case the transfer of forces is of the rotational rather than translational type.

Still further, the stored energy may be kinetic energy stored in a flywheel kept in adequate rotation by a second motor, not shown in the figure.

Hereinafter, reference will be made to emergency braking energy storage means 208 of the linear type, i.e., a helical spring, while the possible application of this invention to all the other previously described forms remains clear.

An arm 211 is connected to a force sensor 212 which generates an electrical signal indicative of braking force 213, which is indicative of the mechanical force applied between the arms 211 and 214. The electrical signal indicative of braking force 213 is carried to the input of the service braking control unit 202.

An arm 214 is connected between the force sensor means 212 and a backlash recuperator 215 which transmits the force to a last arm 216 connected to the pad holder plus brake pad assembly 217.

The backlash recuperator 215 has the purpose of continuously recuperating the wear of the braking pad.

The consumption of the pad may also be recuperated by means of software procedures carried out by the control unit, said procedures not being covered by this patent.

The service braking control unit 202, being electronic in nature, receives at its input a power supply voltage 205, not exclusively originating from the battery of the vehicle.

The service braking control unit 202 is arranged to modulate the supply voltage 205 to control the electric motor included in the electromechanical module 201 through at least one electric control signal 204.

The service braking control unit 202 receives an input signal indicating a service braking force request 203 and is arranged to apply a service braking force corresponding to said service braking force request 203, controlling the electromechanical module 201 to extend the arm 206 until the electrical signal indicative of braking force 213 indicates that the braking force corresponding to the service braking force request 203 has been reached.

It is known that the connection sequence in which the modules 201, 207, 212, 215 are connected may change according to design and manufacturing expedience.

In the initialization phase of the electromechanical braking actuator 200, the service braking control unit 202 provides for controlling the electromechanical module 201 to extend the arm 206 until the mechanical means for storing potential mechanical energy comprised in the emergency braking module 207 is charged with energy for an emergency braking.

Normally in the initialization phase of the electromechanical braking actuator 200, the emergency braking request signal 210 does not indicate a request for an emergency braking, and therefore the emergency braking energy release means 209 are in their first state wherein they hold the potential mechanical energy stored in the emergency braking energy storage means 208 for storing potential mechanical energy.

According to that which has been described above, the emergency braking energy storage means 208 for storing potential mechanical energy perform the same function as that performed by the auxiliary tank 104, storing the energy necessary to apply at least one emergency braking.

Furthermore, the means for releasing the emergency braking energy 209 perform the same function as that performed by the electro-pneumatic emergency valve 116.

Due to mechanical construction problems in the spaces allowed by an electromechanical braking actuator 200, it is complex and expensive to make the emergency braking module 207 in such a way as to retain different values of potential mechanical energy within a certain predetermined range or to retain emergency braking energy values continuously proportional to the current weight.

It is state of the art that the limited applications of electromechanical brakes for railway applications existing today store and apply a single emergency braking force value, normally corresponding to the force value necessary to brake the fully loaded vehicle, thus increasing the risk of wheel flats at each emergency braking event in the presence of lower real weights.

Due to mechanical construction problems in the spaces allowed by an electromechanical braking actuator 200, it is complex and expensive to provide a gradient limiting system for applying the emergency braking force.

It is state of the art for the limited applications of electromechanical brakes for railway applications existing today to release the stored energy for emergency braking with an intrinsic gradient of the potential mechanical energy storage means 208. The gradient is strongly dependent on further factors such as the dependence on the temperature of the materials and the viscosity of the lubricants wherein the mechanical components of the electromechanical brake 200 are immersed.

The functional diagram illustrated in FIG. 2 has a purely illustrative purpose; mechanical designers skilled in the art may replicate the same functions through different variants that would in any case keep the same theoretical functions and operating modes unchanged, i.e., the fact of storing a fixed energy value for a braking emergency and releasing said energy for an emergency braking with an imperfectly controlled or even uncontrolled gradient.

FIG. 3 illustrates a further non-exclusive example of a functional diagram of an electromechanical braking actuator 200 according to the prior art.

A first electromechanical module 201 consisting of at least one electric motor and possibly a speed reducer, or torque multiplier, may extend or retract an arm 206 connected to the force sensor means 212, which generate an electrical signal indicative of braking force 213 indicative of the mechanical force applied between the arms 206 and 214, the electrical signal indicative of braking force 213 being input to the service braking control unit 202.

The arm 214 is connected between the force sensor means 212 and a backlash recuperator 215, which transmits the force to a final arm 216 connected to the pad-holder plus brake pad assembly 217.

The emergency braking energy release means, for example a switching device 302, are controlled by an emergency braking request signal 301. The switching device is arranged to connect the electrical control signals 204 to the control unit 202 for service braking when the emergency braking request signal 301 does not indicate an emergency braking request. The switching device is arranged to connect the electrical control signals 204 to an electronic emergency braking unit 303 when the emergency braking request signal 301 does not indicate an emergency braking request.

The service braking control unit 202 receives an input voltage 205, not exclusively coming from the vehicle battery.

The service braking control unit 202 is designed to modulate the supply voltage 205 to control the electric motor comprised in the electromechanical module 201 through an electrical control signal group 204.

The service braking control unit 202 receives as input a service braking force request 203 and is arranged to apply a braking force corresponding to said service braking force request 203 by commanding the electromechanical module 201 to extend the arm 206 until the electrical signal indicative of braking force 213 indicates that the braking force corresponding to the service braking force request 203 has been reached.

It is known that the connection sequence with which the electromechanical module 201, the force sensor means 212, and the backlash recuperator 215 are connected may change according to design and manufacturing expedience.

The electronic emergency braking unit 303 may include, but is not limited to, an electrical energy storage unit 304 such as a battery or super-capacitor, an energy charger 305 that provides for transferring energy from the power source 205 to said energy storage unit 304, a modulation circuit 306 arranged to modulate the energy stored in the energy storage unit 304 for the electric motor forming part of the electromechanical module 201 when the emergency request signal 301 indicates a request for emergency braking. The modulation circuit 306 is arranged not to modulate the energy stored in the energy storage unit 304 for the electric motor forming part of the electromechanical module 201 when the emergency braking request signal 301 does not indicate a request for emergency braking.

According to the foregoing, the electrical energy storage unit 304 performs the same function as that performed by the auxiliary tank 104, storing the energy necessary to apply at least one emergency braking.

Additionally, the switching device 302 performs the same function as that performed by the electro-pneumatic emergency valve 116.

In order to provide an emergency braking force proportional to the current weight of the bogie to be braked and with a controlled gradient, the modulation circuit 306 must calculate its value based on the electrical signal 307 indicative of the weight of the bogie to be braked and to close the control loop by reading the electrical signal indicative of braking force 213 indicative of the current force value applied.

In practice, in the configuration shown in FIG. 3, the modulation circuit 306 assumes the same circuit and software complexity as the service braking control unit 202, with the addition of having to be developed according to safety level SIL≥3 with respect to EN50129, EN50129 standards.

SUMMARY OF INVENTION

One object of this invention, therefore, is to provide an electromechanical service and emergency braking actuator for a railway vehicle that may be made to enable cost-effective emergency braking while maintaining all the requirements compatible with the state-of-the-art pneumatic emergency brake.

The aforesaid and other objects and advantages are achieved, according to one aspect of the invention, by an electromechanical service and emergency braking actuator for a railway vehicle having the features defined in claim 1 or 4. Preferred embodiments of the invention are defined in the dependent claims, the content of which is to be understood as an integral part of this description.

BRIEF DESCRIPTION OF THE DRAWINGS

The functional and structural features of some preferred embodiments of an electromechanical service and emergency braking actuator for a railway vehicle according to the invention will now be described. Reference is made to the appended drawings, wherein.

DETAILED DESCRIPTION

Figure 1:
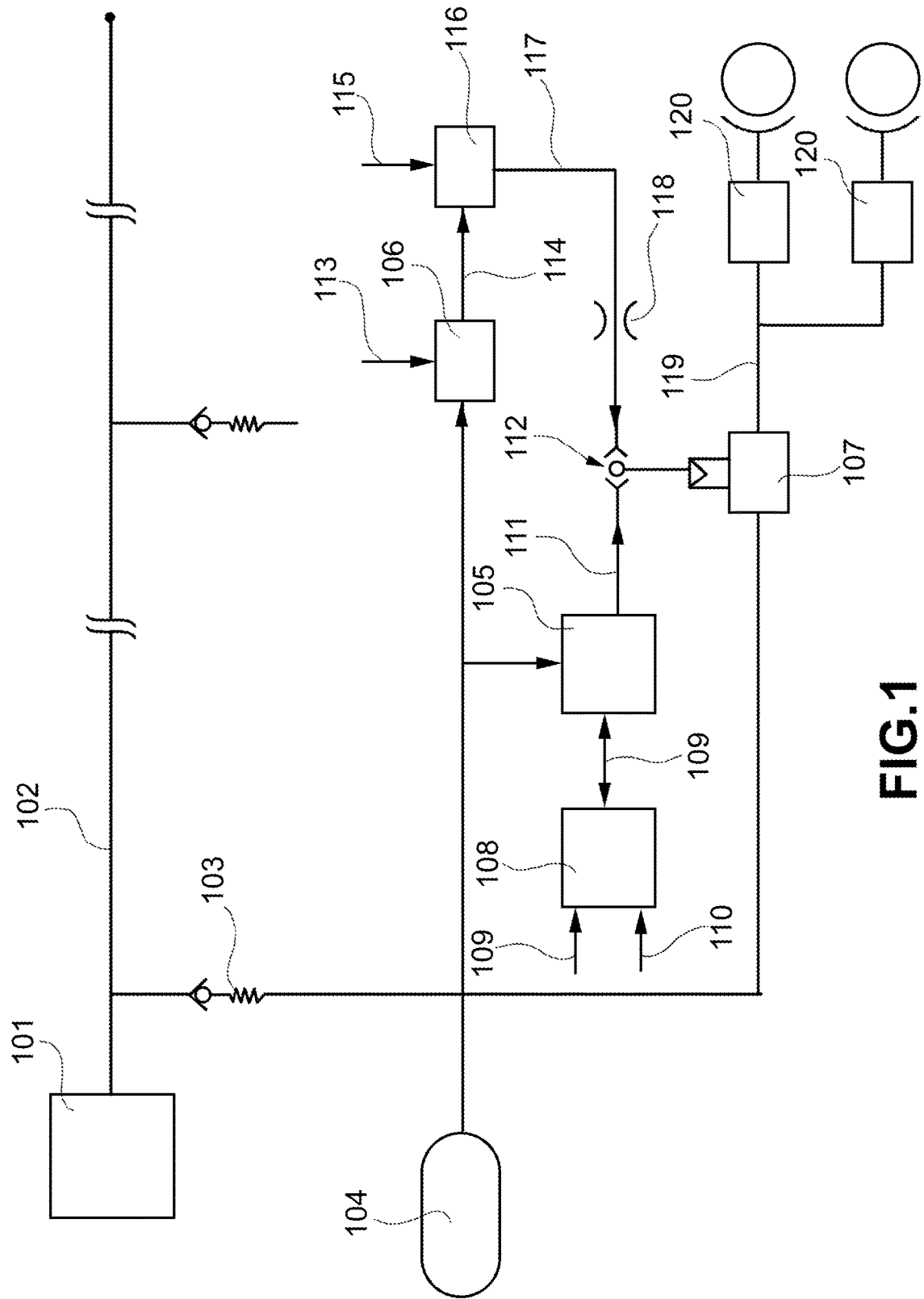
FIG. 1 shows a generic pneumatic braking system for railway applications, particularly for passenger trains.
Figure 2:
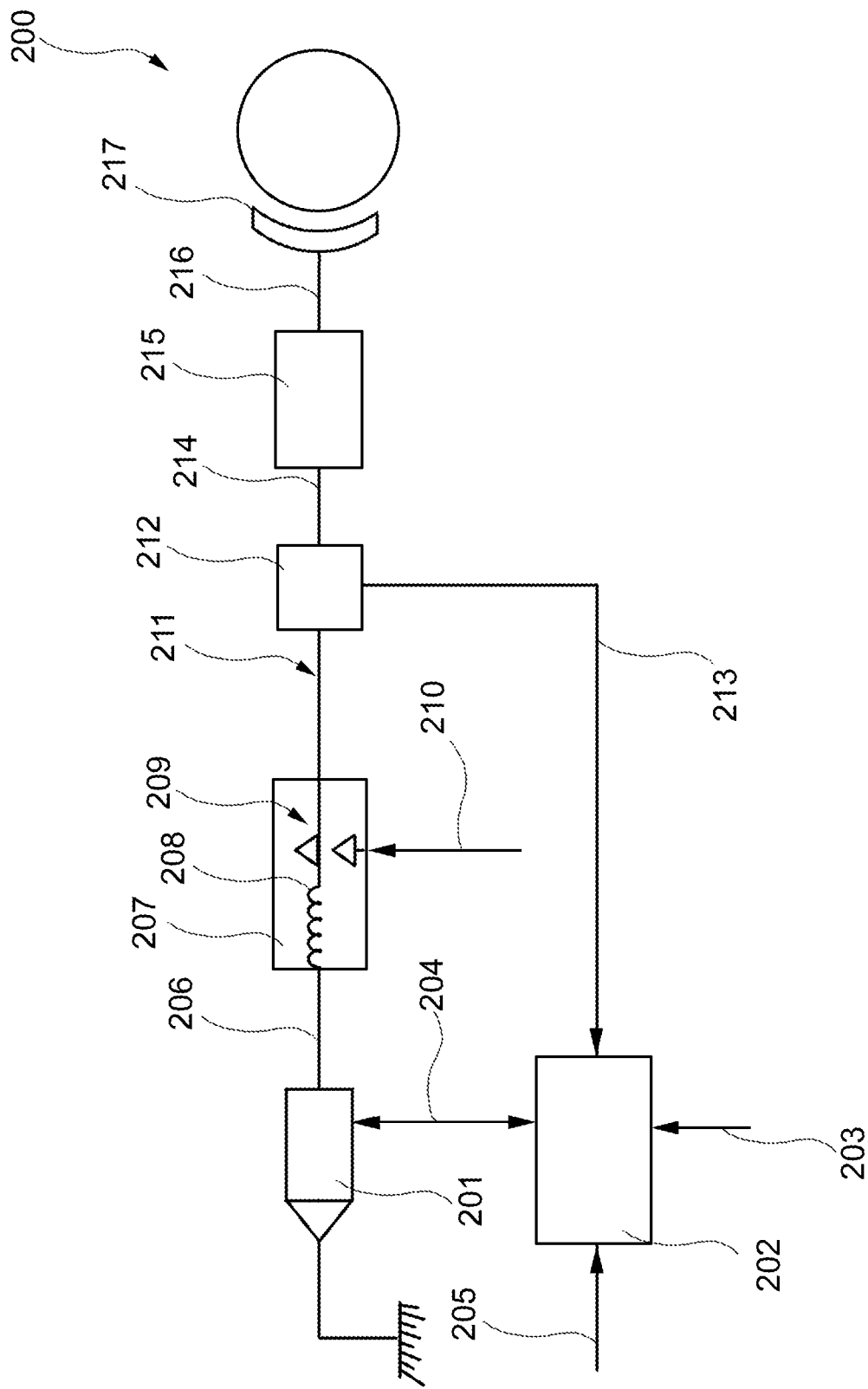
FIG. 2 illustrates a first non-exclusive example of a functional diagram of an electromechanical braking actuator according to the prior art.

Before describing a plurality of embodiments of the invention in detail, it should be clarified that the invention is not limited in its application to the construction details and configuration of the components presented in the following description or illustrated in the drawings. The invention is capable of assuming other embodiments and of being implemented or constructed in practice in different ways. It should also be understood that the phraseology and terminology have a descriptive purpose and should not be construed as limiting. The use of "include" and "comprise" and their variations is to be understood as encompassing the elements set out below and their equivalents, as well as additional elements and the equivalents thereof.

Figure 4:
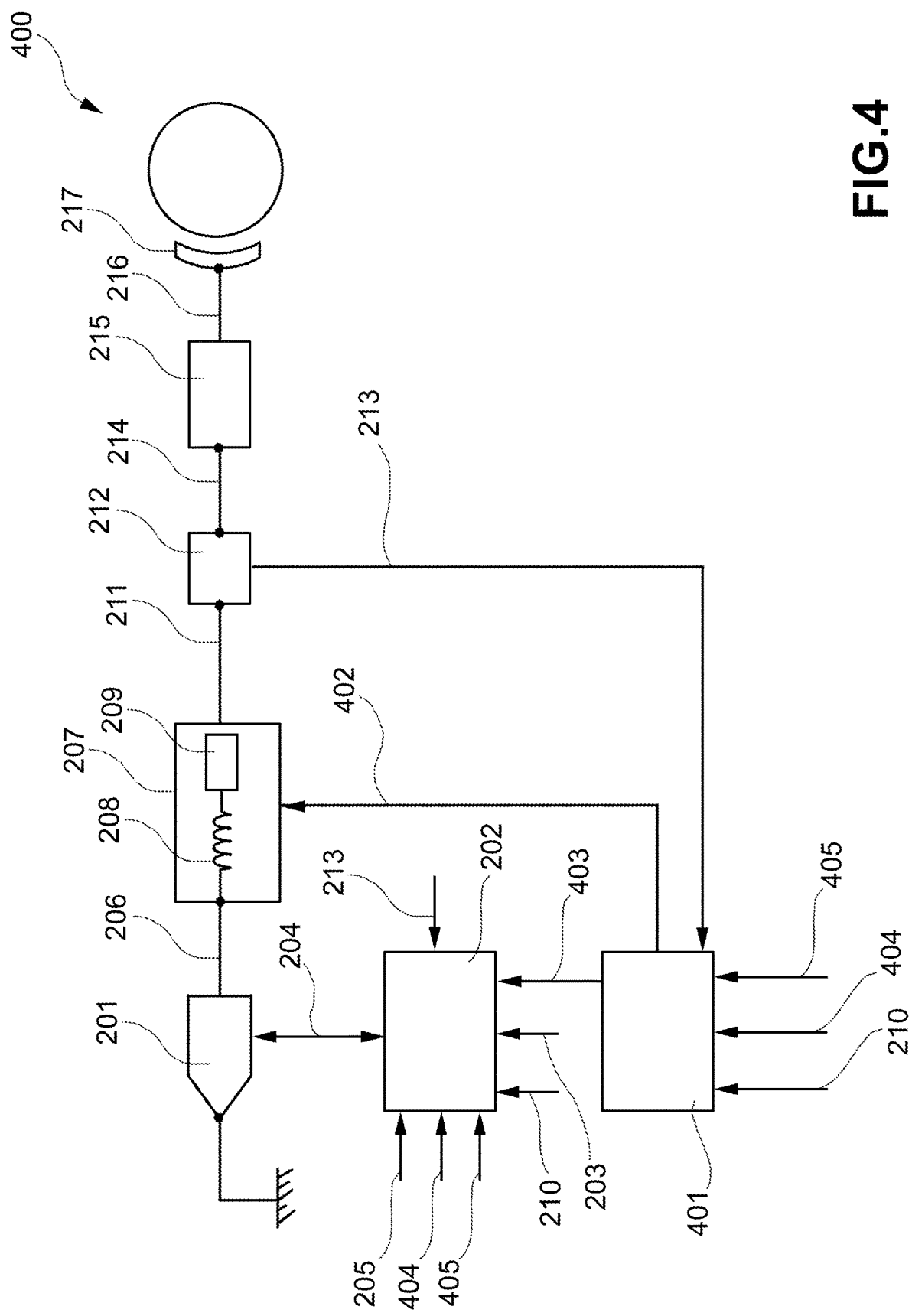
FIG. 4 illustrates an embodiment of an electromechanical service and emergency braking actuator for a railway vehicle according to the invention.

Referring initially to FIG. 4, an electromechanical service and emergency braking actuator 400 for a railway vehicle is shown.

This electromechanical service and emergency braking actuator 400 includes a first electromechanical module 201 for generating a first braking force. The first electromechanical module 201 is arranged to receive a first braking force control signal 204 and to generate a first braking force, the value of which is a function of said first braking force control signal 204.

The first braking force control signal 204 may also be a signal that carries power to said first electromechanical module 201 and, in that case, will be a braking force control signal and power supply. Otherwise, a separate power signal may be provided.

The electromechanical service and emergency braking actuator 400 further comprises first force sensor means 212 arranged to measure said first braking force generated by the first electromechanical module 201 and to generate a first electrical signal indicative of braking force 213. The value of the first electrical signal indicative of braking force 213 is indicative of the value of said first braking force.

The force sensor means may be, for example, a force sensor.

Furthermore, the electromechanical service and emergency braking actuator 400 comprises first emergency braking energy storage means 208, 304 arranged to store an amount of energy sufficient to actuate at least one emergency braking.

Still further, the electromechanical service and emergency braking actuator 400 comprises a safety unit 401, arranged to emit a first emergency braking control signal 402, and first emergency braking energy release means 209.

The first emergency braking energy release means 209 are arranged to prevent the first emergency braking energy storage means 208, 304 from releasing the stored energy when the first emergency braking control signal 402, 502 indicates not to release the stored energy. The emergency braking energy release means 209 are further arranged to allow the first emergency braking energy storage means 208, 304 to release the stored energy to actuate the at least one emergency braking when said first emergency braking control signal 402, 502 indicates to release the stored energy to actuate the at least one emergency braking.

In other words, the first emergency braking energy release means 209 are arranged to have a first state, wherein they retain the potential energy previously stored in the emergency braking energy storage means 208 when the first emergency braking control signal 402 does not command the release of the energy for an emergency braking, and to have a second state, wherein they release the potential energy previously stored in the emergency braking energy storage means 208 when the first emergency braking control signal 402 commands the release of energy for an emergency braking.

In addition, the electromechanical service and emergency braking actuator 400 comprises a first service braking control unit 202.

The service braking control unit 202 is arranged to receive an electrical service braking request signal 203 and an electrical emergency braking request signal 210.

Naturally, the service braking control unit 202 may be arranged to receive a power supply 205.

The service braking control unit 202 is further arranged to calculate a service braking force value as a function of the electrical service braking request signal 203 and to control the first electromechanical module 201 via the first braking force control signal 204 to generate the first braking force having a value corresponding to said service braking force value when said electrical emergency braking request signal 210 does not indicate an emergency braking request.

Additionally, the service braking control unit 202 is arranged to calculate an emergency braking force value as a function of a predetermined emergency deceleration value and to control said first electromechanical module 201 via said first braking force control signal 204 to generate the first braking force having a value corresponding to said emergency braking force value when said first electrical emergency braking request signal 210 indicates an emergency braking request.

In other words, the first service braking control unit 202 may continuously calculate the emergency braking force value as a function of at least the predetermined emergency deceleration value, e.g., indicated by a further input signal 405 or predetermined in the design stage and stored in a non-volatile memory of said service braking control unit 202.

The safety unit 401 described above is further arranged for receiving an emergency braking request signal 210, receiving and monitoring the first electrical signal indicative of braking force 213, and calculating the value of an emergency braking force based on the predetermined emergency deceleration value.

Furthermore, the safety unit 401 is arranged to adjust the first emergency braking control signal 402 so as to indicate to the first emergency braking energy release means 209, 302 not to release the stored energy when the emergency braking request signal 210 does not indicate an emergency braking request or when the emergency braking request signal 210 indicates an emergency braking request and the first electrical signal indicative of braking force 213 indicates, within a predetermined maximum delay time, a force value coinciding with the further emergency braking force value calculated by said safety unit 401 or a force value which falls, within a predetermined maximum delay time, in a predetermined tolerance range including said further emergency braking force value calculated by said safety unit 401.

Furthermore, the safety unit 401 is arranged to adjust the first emergency braking control signal 402 so as to indicate to the first emergency braking energy release means 209, 302 to release the energy stored in the first emergency braking energy storage means 208, 304 when the emergency braking request signal 210 indicates an emergency braking request and the first electrical signal indicative of braking force 213 does not indicate, within a predetermined maximum delay time, a force value coinciding with the further emergency braking force value calculated by said safety unit 401 or a force value that does not fall, within a predetermined maximum delay time, in a predetermined tolerance range including said further value of emergency braking force calculated by said safety unit 401.

In other words, the safety unit 401 may monitor the first electrical signal indicative of braking force 213 and verify that its value corresponds to the emergency braking force value calculated therefrom, within a predetermined tolerance range and within a predetermined maximum delay time.

As long as the safety unit 401 verifies that the value of the first electrical signal indicative of braking force 213 corresponds to the emergency braking force value calculated therefrom and controlled by the first control unit for service braking 202, within a predetermined tolerance range and within a predetermined maximum delay time, the safety unit 401 maintains the emergency braking control signal 402 in the condition of not releasing the emergency energy stored in the first emergency braking energy storage means 208, allowing the first service braking control unit 202 to perform the emergency braking. If the safety unit 401 verifies that the first electrical signal indicative of braking force 213 does not correspond to the value of the emergency braking force calculated therefrom and commanded by the first service braking control unit 202 within a predetermined tolerance range and within a predetermined maximum delay time, the safety unit 401 may bring the emergency braking control signal 402 into the condition of releasing the emergency energy stored in the braking energy storage means 208, applying an emergency braking.

In this first embodiment, both the safety unit 401 and the first service braking control unit 202 calculate the emergency braking force value continuously and independently of each other.

An emergency braking force application gradient may be calculated by the first service braking control unit 202 and applied in real time when the emergency braking request occurs. Otherwise, the application gradient may be stored in the non-volatile memory of the first service braking control unit 202 and applied during the application of the emergency braking force.

The service braking control unit 202 may be arranged to control the first electromechanical module 201 via the first braking force control signal 204 so as to generate the first braking force having the value corresponding to the greater of the value of the service braking force calculated by the first service braking control unit 202 and the value of the emergency braking force calculated by the first service braking control unit 202. When the value of the service braking force calculated by the first service braking control unit 202 is greater than the value of the emergency braking force calculated by the first service braking control unit, the safety unit 401 is arranged to adjust the first emergency braking control signal 402, 502 so as to indicate to the first emergency braking energy release means 209, 302 not to release the stored energy, even if the braking request signal 210 indicates an emergency braking request and the first electrical signal of actual braking force 213 indicates, within a predetermined maximum delay time, a force value greater than the additional emergency braking force value calculated by said safety unit 401 or a force value that is greater than an upper end value of said predetermined tolerance range including said further emergency braking force value calculated by said safety unit 401, i.e., greater than the upper threshold of said tolerance range. This is necessary so that the safety unit does not intervene if it is necessary to generate a braking with the value of the service braking force greater than the value of the emergency braking force.

The first service braking control unit 202 may also be arranged to receive a weight signal 404 indicative of the weight of a bogie of the railway vehicle or of the railway vehicle. Furthermore, it may be set up to calculate the service braking force value as a function of the electrical service braking request signal 203 and the weight signal 404 and to calculate the emergency braking force value as a function of the predetermined emergency deceleration value and of the weight signal 404. The safety unit 401 is further arranged to calculate the further emergency braking force value as a function of the predetermined emergency deceleration value and the weight signal 404.

The predetermined emergency deceleration value may be provided to the service braking control unit 202 and/or the safety unit 401 by means of an electrical signal.

In this case, if the safety unit 401 verifies that the first electrical signal indicative of braking force 213 does not correspond to the value of the emergency braking force calculated therefrom and controlled by the first service braking control unit 202 within a predetermined tolerance range and within a predetermined maximum delay time, the safety unit 401 brings the first emergency braking control signal 402 into the condition of releasing the emergency energy stored in the first braking force energy storage means 208, applying in any case an emergency braking even if degraded with regard to the weighing and/or the application gradient.

Figure 5:
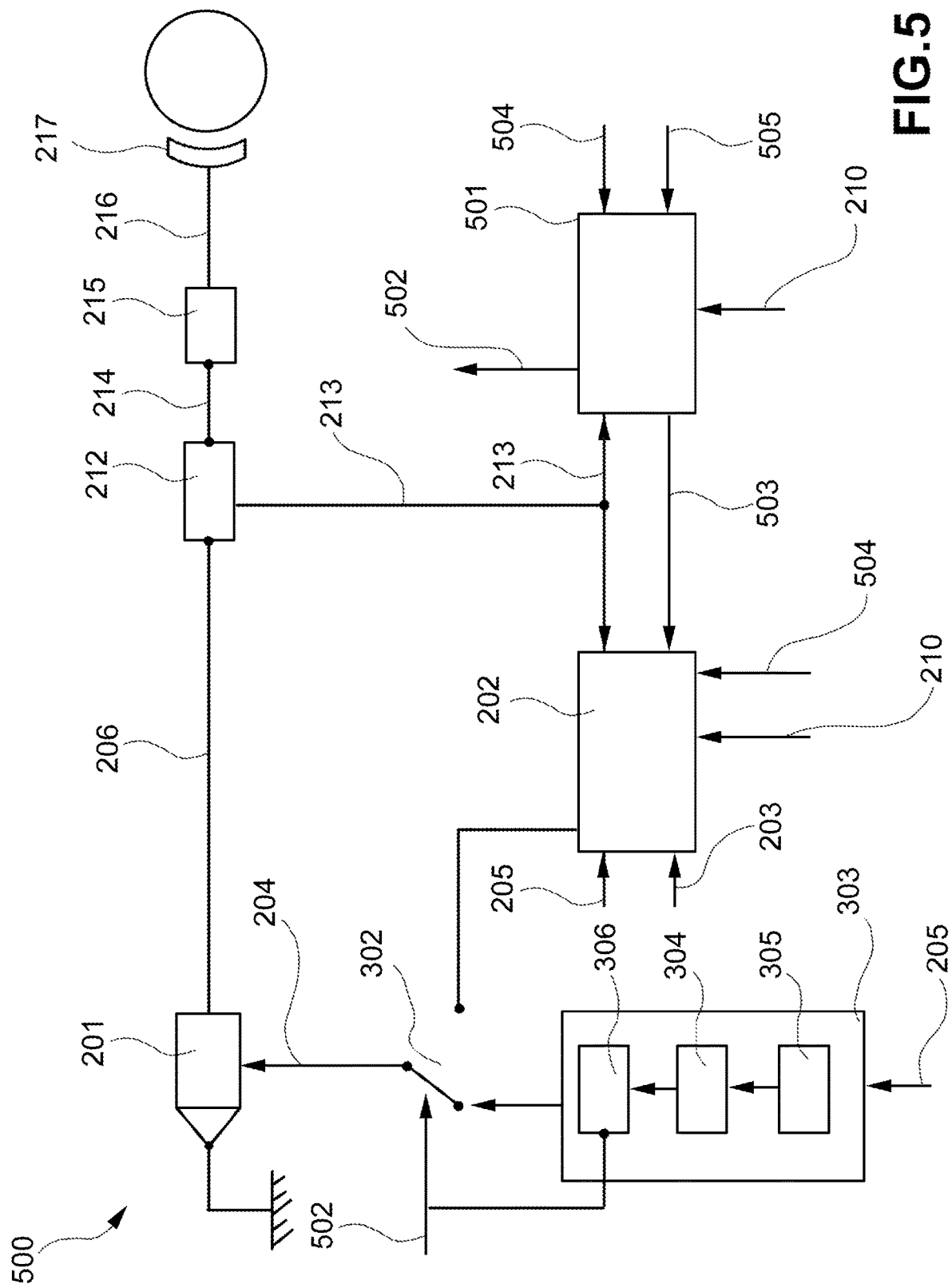
FIG. 5 illustrates a further embodiment of an electromechanical service and emergency braking actuator for a railway vehicle according to the invention.

Observing FIG. 5, in a second embodiment, the electromechanical service and emergency braking actuator 500 for a railway vehicle again comprises a first electromechanical module 201, the first force sensor means 212, the first emergency braking energy storage means 208, and the first means for releasing the emergency braking energy 209.

The electromechanical service and emergency braking actuator 500 again comprises a safety unit 501, which, however, in this second embodiment is arranged for receiving an emergency braking request signal 210, calculating the emergency braking force value as a function of the predetermined emergency deceleration value, sending the emergency braking force value calculated therefrom to the first service braking control unit 202 via a first electrical emergency braking force request signal 503, and emitting an emergency braking control signal 502.

In this second embodiment, the electromechanical service and emergency braking actuator 500 again comprises a first service braking control unit 202 which, however, is arranged for:
  receiving an electrical service braking request signal 203, an electrical emergency braking request signal 210;
  calculating a service braking force value as a function of the electrical service braking request signal 203;
  controlling said first electromechanical module 201 via the first braking force control signal 204 to generate the first braking force having a value corresponding to said service braking force value when said electrical emergency braking request signal 210 does not indicate an emergency braking request;
  controlling said first electromechanical module 201 via the first braking force control signal 204 to generate the first braking force having a value corresponding to said emergency braking force value which the first service braking control unit 202 received from the safety unit 501 via said first electrical emergency braking force request signal 503 when the emergency braking request signal 210 indicates an emergency braking request.

Also in this second embodiment, the safety unit 501 is arranged for:
  receiving and monitoring the first electrical signal indicative of braking force 213;
  adjusting the first emergency braking control signal 502 so as to indicate to the first emergency braking energy release means 209, 302 not to release the stored energy, when the emergency braking request signal 210 does not indicate an emergency braking request or when the emergency braking request signal 210 indicates a request for emergency braking and the first electrical signal indicative of braking force 213 indicates, within a predetermined maximum delay time, a force value coinciding with said emergency braking force value calculated by said safety unit 501 or a force value that falls, within a predetermined maximum delay time, within a predetermined tolerance range including said emergency braking force value calculated by said safety unit 501;
  adjusting the first emergency braking control signal 502 so as to indicate to the first emergency braking energy release means 209, 302 to release the energy stored in the first emergency braking energy storage means 208, 304, when the emergency braking request signal 210 indicates a request for an emergency braking and the first electrical signal indicative of braking force 213 does not indicate, within a predetermined maximum delay time, a force value coinciding with the emergency braking force value calculated by said safety unit 501 or a force value that does not fall within a predetermined maximum delay time, within a predetermined tolerance range including said emergency braking force value calculated by said safety unit 501.

Unlike that which is described in the first embodiment, in this second embodiment the safety unit 501 communicates the emergency braking force value by means of a signal 503 further reducing the complexity of the safety unit 401.

Also for this second embodiment, the service braking control unit 202 may be further arranged to receive a weight signal 504 indicative of the weight of a bogie of the railway vehicle or of the railway vehicle to calculate the service braking force, the value of which is a function of the electrical service braking request signal 203 and the weight signal 504. Furthermore, the safety unit 501 may be arranged to receive the weight signal 504 to calculate the value of the emergency braking force as a function of the predetermined emergency deceleration value and of the weight signal 504.

In other words, the safety unit 501 may continuously calculate the emergency braking force value as a function of at least the predetermined emergency deceleration value, for example indicated by a further input signal 505 or preset in the design phase and stored in a non-volatile memory of said safety unit.

The safety unit 501 may send the calculated emergency braking force value to the first service braking control unit 202 via the first electrical emergency braking force request signal 503.

As long as the safety unit 401 verifies that the first electrical signal indicative of braking force 213 corresponds to the value of the emergency braking force calculated therefrom and requested from the first service braking control unit 202 via the first electrical emergency braking force request signal 403, within a predetermined tolerance range and within a predetermined maximum delay time, said safety unit 501 maintains the emergency braking control signal 502 in the condition of not releasing the emergency braking energy stored in the first emergency braking energy storage means 208, allowing the first service braking control unit 202 to perform emergency braking according to the actual weight on the associated bogie or body, and with the predetermined gradient.

If the safety unit 501 verifies that the first electrical signal indicative of braking force 213 does not correspond to the value of the emergency braking force calculated therefrom and requested from the first service braking control unit 202 via the first electrical emergency braking force request signal 503, within a predetermined tolerance range and within a predetermined maximum delay time, said safety unit 501 brings the first emergency braking control signal 502 into the condition of releasing the emergency braking energy stored in the first emergency braking energy storage means 208, applying in any case an emergency braking even if degraded with regard to the weighing and/or the application gradient.

Also for this second embodiment, the first control unit for service braking 202 may be arranged to control the first electromechanical module 201 via the first braking force control signal 204 so as to generate the greater of the value of the service braking force calculated by the first service braking control unit 202 and the value of the emergency braking force transmitted to the first service braking control unit 202 by the safety unit 501. Again, when the value of the service braking force calculated by the first service braking control unit 202 is greater than the value of the emergency braking force received by the first service braking control unit, the safety unit 501 is arranged to adjust the first emergency braking control signal 502 so as to indicate to the first emergency braking energy release means 209, 302 not to release the stored energy, even if the emergency braking request signal 210 indicates a request for emergency braking and the first electrical signal of actual braking force 213 indicates, within a predetermined maximum delay time, a force value greater than the emergency braking force value calculated by said safety unit 501 or a force value that is greater than an upper end value of said predetermined tolerance range including said emergency braking force value calculated by said safety unit 501, i.e., higher than the upper threshold of this tolerance range.

The safety unit 501 may also be arranged to send a null emergency braking force value to the first service braking control unit 202 via the first electrical emergency braking force request signal 503 when the emergency braking request signal 210 does not indicate the emergency braking request.

For all the embodiments described heretofore, the electromechanical service and emergency braking actuator 400, 500 may comprise an integrated module, e.g., an integrated mechatronic module, including at least the first electromechanical module 201, the first force sensor means 212, the first emergency braking energy storage means 208, 304, the first emergency braking energy release means 209, 302, the first service braking control unit 202, the safety unit 401, 501.

Figure 6:
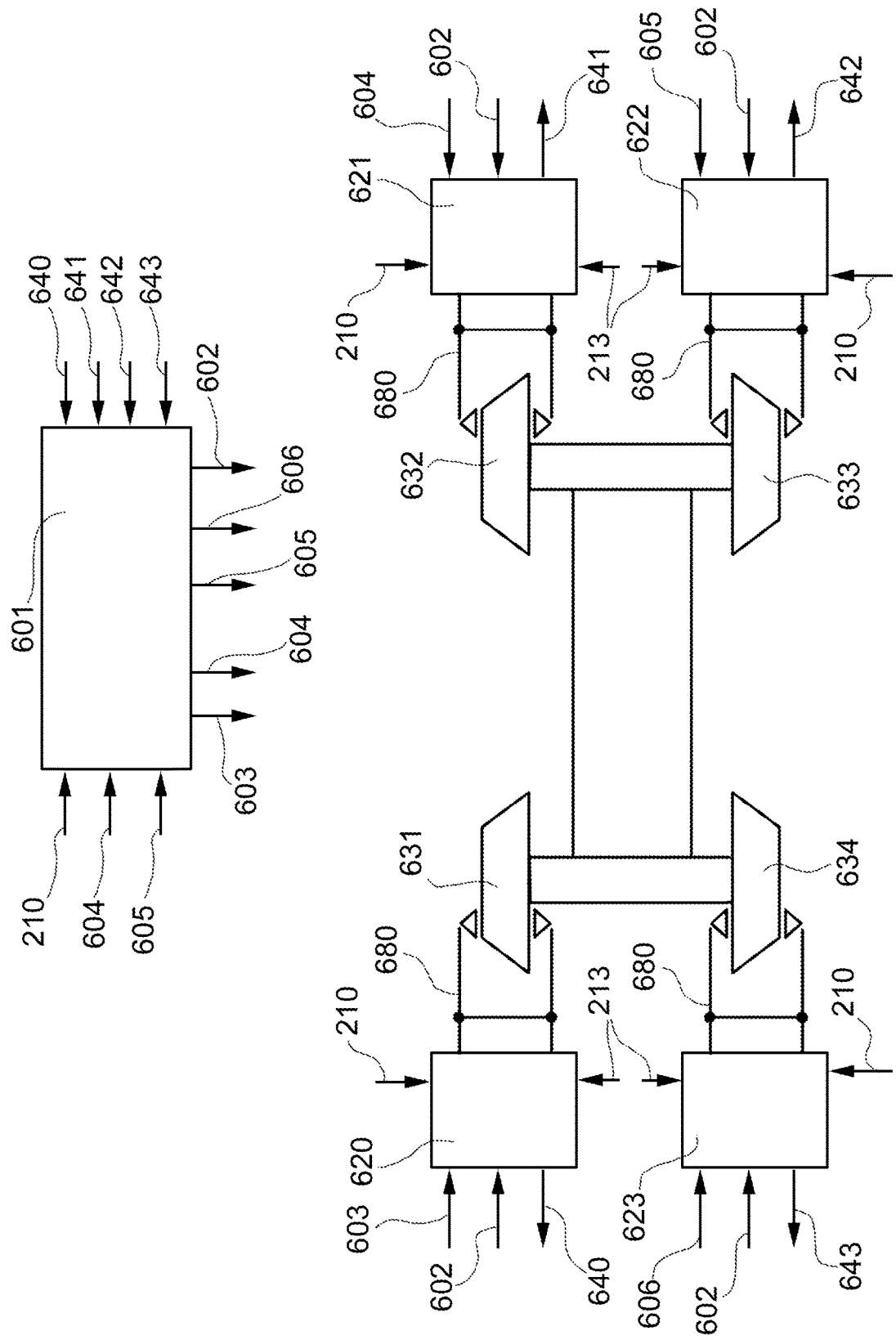
FIG. 6 illustrates an embodiment of an electromechanical braking system for at least one railway vehicle according to this invention.

Otherwise, referring to FIG. 6, the electromechanical service and emergency braking actuator 400, 500 may comprise an integrated module which includes the first electromechanical module 201, the first force sensor means 212, the first emergency braking device energy storage means 208, 304, the first emergency braking energy release means 209, 302, the first service braking control unit 202. In this case, the safety unit 401, 501, 601 may be external to said integrated module. For example, this figure illustrates a railway bogie which comprises for example four wheels 631, 632, 633, 634, and may be equipped with at least two of these integrated modules including the first electromechanical module 201, the first force sensor means 212, the first emergency braking energy storage means 208, 304, the first emergency braking energy release means 209, 302, the first service braking control unit 202, each one for each axle, or four of these integrated modules 620, 621, 622, 623, each associated with the respective wheel 631, 632, 633, 634.

Figure 7:
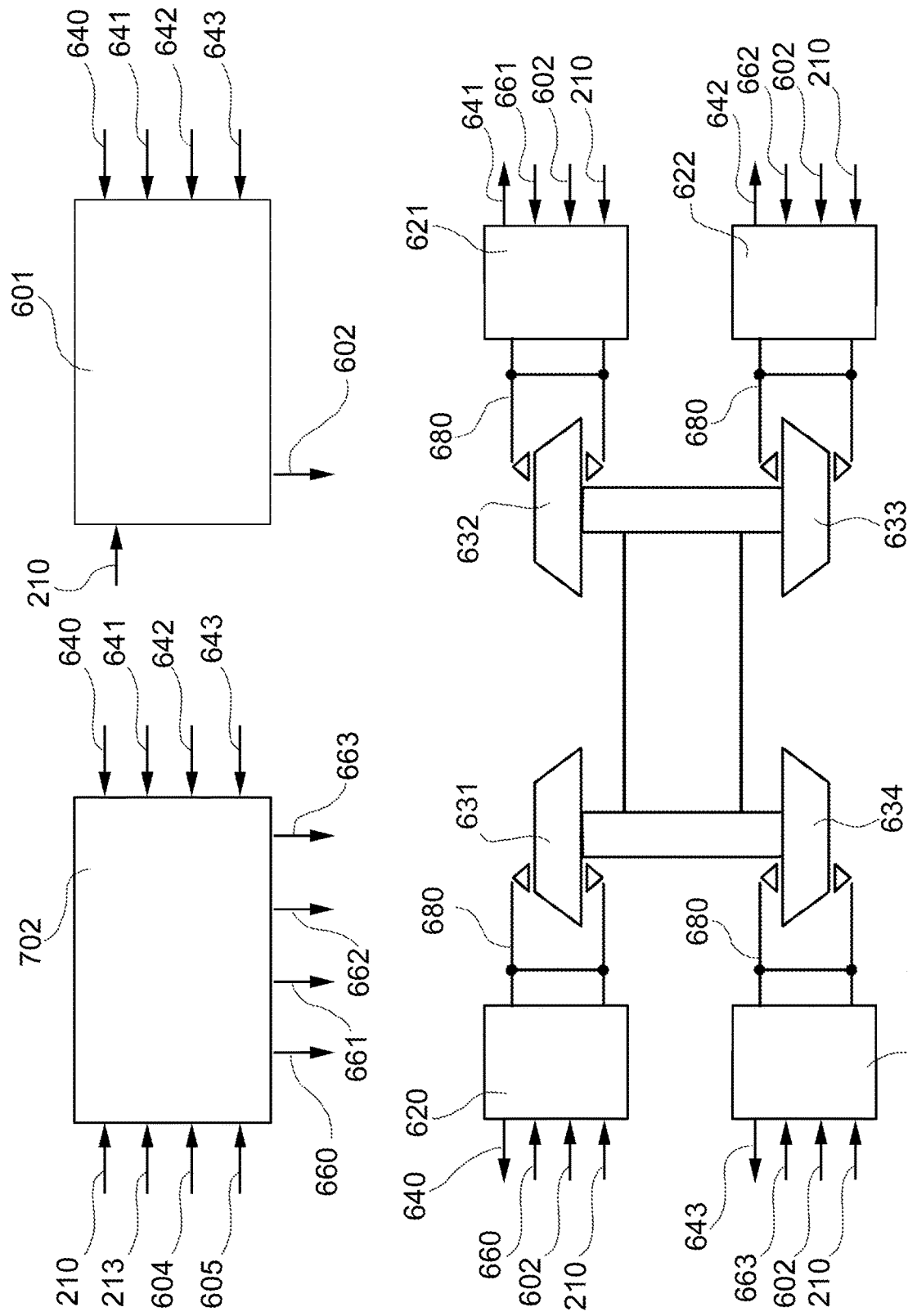
FIG. 7 illustrates a further embodiment of an electromechanical braking system for at least one railway vehicle according to this invention.

Otherwise, referring to FIG. 7, the integrated module may include the first electromechanical module 201, the first force sensor means 212, the first emergency braking energy storage means 208, 304 and the first emergency braking energy release means 209, 302. In this case, the safety unit 401, 501, 601 and the first service braking control unit 702 may be external to said integrated module. For example, in this figure a railway carriage is shown again which comprises for example four wheels 631, 632, 633, 634, and may be equipped with at least two such integrated modules including the first electromechanical module 201, the first force sensor means 212, the first emergency braking energy storage means 208, 304 and the first emergency braking energy release means 209, 302, each one for each axle, or four such integrated modules 620, 621, 622, 623, each associated with the respective wheel 631, 632, 633, 634.

In a further aspect, the first braking force generated by the first electromechanical module 201 is arranged to be transmitted to braking means, by means of mechanical transmission means 216, 680.

The braking means may comprise at least one disc friction pad or wheel friction block 631, 632, 633, 634.

The first emergency braking energy storage means 208 may comprise a potential mechanical energy storage means or a mechanical kinetic energy storage means or an electrical energy storage means.

It is prior art that the control unit is developed according to a $SIL \leq 2$ level according to EN50128, EN50129 standards. The safety unit 401, 501, 601 may have a safety integrity level, SIL, greater than the safety integrity level, SIL, of the first service braking control unit 202, 702. The safety unit 401, 501, 601 may have the safety integrity level $SIL \geq 3$.

By developing the safety unit 401, 501, 601 according to a $SIL \geq 3$ level, the complete system, in particular in relation to emergency braking, is brought to the same level associated with the safety unit 401, 501, 601.

Advantageously, the safety unit is of much simpler construction than the first service braking control unit 202.

In a further aspect, the safety unit 401, 501, 601 may be made according to an architecture including at least one microprocessor and/or at least one programmable device. This is useful for achieving a $SIL \geq 3$ level.

Figure 3:
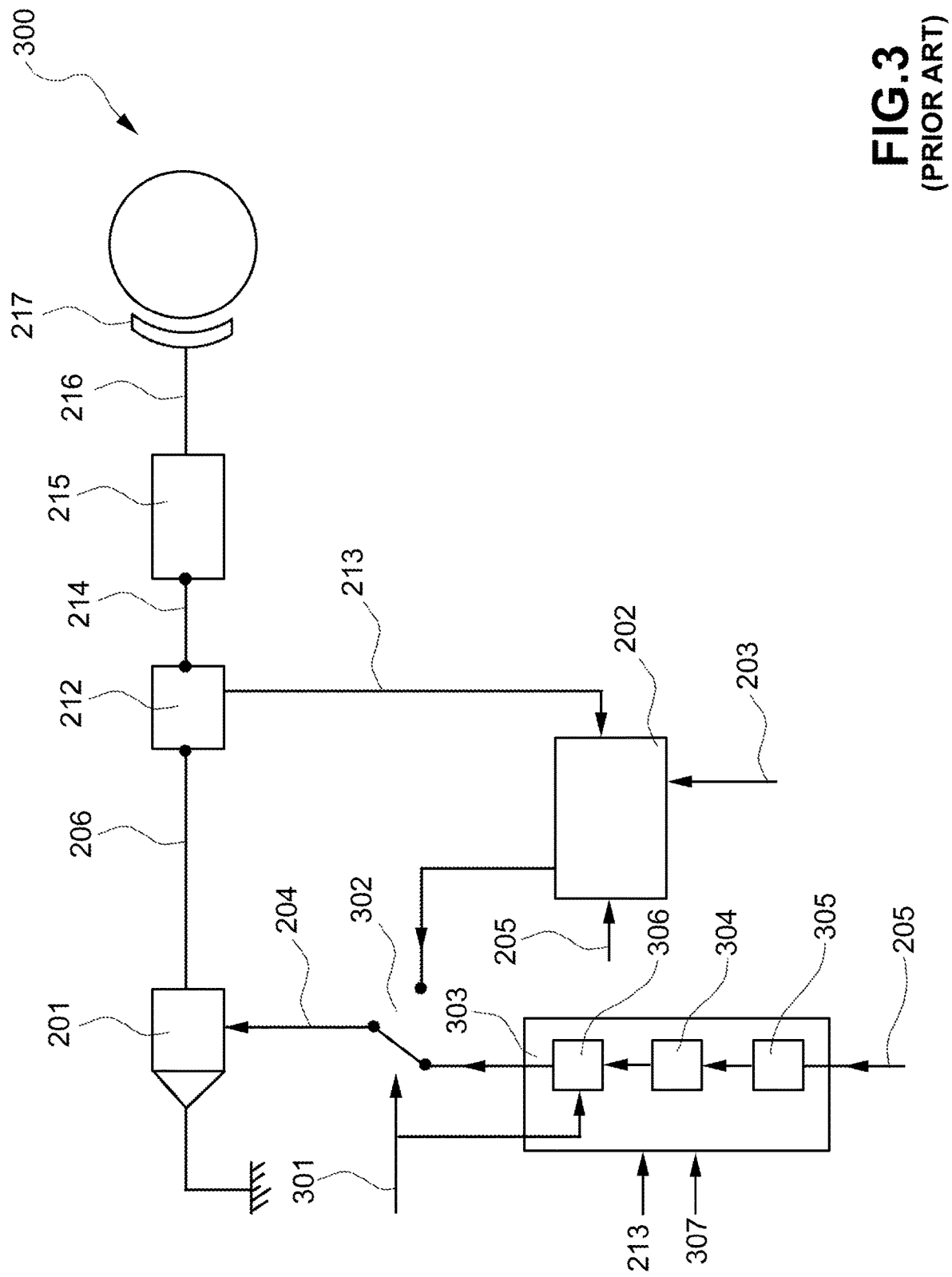
FIG. 3 illustrates a further non-exclusive example of a functional diagram of an electromechanical braking actuator 200 according to the prior art.

To describe an embodiment example, it is possible to refer again to FIG. 5. This figure shows a functional diagram of an electromechanical braking actuator 300 as illustrated in FIG. 3 and previously described, modified in accordance with this invention.

The safety unit 501 generates a first electrical emergency braking control signal 502 for controlling the first emergency braking energy release means, i.e., a switching device 302 arranged to connect the first electrical control signal 204 to the first service braking control unit 202 when the first emergency braking control signal 501 does not indicate a command to apply an emergency braking. The switching device 302 is arranged to connect the first electrical control signal 204 to an electronic emergency braking unit 303 when said emergency braking request signal 301 indicates an emergency braking request.

Furthermore, the electrical emergency braking control signal 502 may control a modulation circuit 306 arranged to modulate the energy stored in the energy storage unit 304 for the electric motor forming part of the first electromechanical module 201 when the emergency braking request signal 301 indicates an emergency braking request.

The modulation circuit 306 is arranged so as not to modulate the energy stored in the energy storage unit 304 for the electric motor forming part of the electromechanical module 201 when the emergency braking request signal 301 does not indicate an emergency braking request.

According to the foregoing, the electrical energy storage unit 304 performs the same function as that performed by the auxiliary tank 104, storing the energy necessary to apply at least one emergency braking.

The safety unit 501 receives at its input the emergency braking request signal 210, the first electrical signal indicative of braking force 213 generated by the first force sensor means 212 and the signal 504 indicative of the weight of the bogie or vehicle to be braked (when present).

According to the second embodiment described previously, the safety unit 501 may continuously calculate the emergency braking force value as a function of the predetermined emergency deceleration value indicated by a further input signal 505. or predetermined in the design phase and stored in the non-volatile memory of said safety unit and of the weight value received through the signal 504 (when present).

According to said second embodiment, the safety unit 501 sends the calculated emergency braking force value to the first service braking control unit 202 via the first electrical signal 503.

When the emergency braking request signal 210 does not indicate an emergency braking request, the first control unit 210 controls the first electromechanical module 201 to obtain service braking forces as a function of the service braking force request 203.

When the emergency braking request signal 210 indicates an emergency braking request, the first service control unit 210 commands the first electromechanical module 201 to obtain a braking force equal to the emergency braking force value corresponding to the first electrical emergency braking signal 503.

The emergency braking force application gradient may be calculated by the safety unit 501 and applied in real time to the emergency braking force value 503.

Alternatively, the emergency braking force signal 503 may always indicate the target value, the application gradient may be stored in the non-volatile memory of the service braking control unit 202 and applied by said first electronic service control unit during the application of the emergency braking force.

At the same time, the safety unit 501 may monitor the first electrical signal indicative of braking force 213 and verify that it corresponds to the emergency braking force value calculated therefrom, within a predetermined tolerance range and within a predetermined maximum delay time.

As long as the safety unit 501 verifies that the first electrical signal indicative of braking force 213 corresponds to the emergency braking force value calculated therefrom and requested from the first service braking control unit 202 via the signal 503, within a predetermined tolerance range and within a predetermined maximum delay time, said safety unit 501 may maintain the signal 502 in the condition of connecting the control signals 204 to the control unit for service braking 202, allowing the service braking control unit 202 to perform the emergency braking as calculated by the safety module 501, i.e., according to the actual weight on the associated bogie or body, and with the predetermined gradient.

If the safety unit 501 verifies that the first electrical signal indicative of braking force 213 does not correspond to the emergency braking force value calculated therefrom and requested from the control unit for service braking 202 via the signal 503, within a predetermined tolerance range and within a predetermined maximum delay time, said safety unit 501 may act on the electrical emergency braking control signal 502, causing the switching device 302 to switch to the state wherein it connects the control signal 204 to the modulation circuit 306, and activating said modulation circuit 306 to modulate the energy stored in the energy storage unit 304 for the electric motor forming part of the electromechanical module 201.

Advantageously, the safety unit 501 is of much simpler construction than the service braking control unit 202.

The introduction of the safety unit 501 greatly simplifies the modulation circuit 306. In this architectural configuration, the modulation circuit 306 becomes a backup circuit, which requires design simplicity and reliability in the very rare cases wherein the first service control unit 202 is unable to execute the control of the first electromechanical module 201.

Considering the first embodiment, as the only difference with respect to the second embodiment, both the safety unit 401 and the service braking control unit 202 continuously and independently calculate the emergency braking force value as a function of an emergency deceleration value indicated by a further input signal 405 or predetermined in the design stage and stored in the non-volatile memory of said safety unit and the weight value received through the weight signal 404.

Unlike what is described in the second embodiment, the safety unit 401 does not communicate the emergency braking force value via a signal 503, further reducing the complexity of the safety unit 401.

In a further aspect, with reference to FIGS. 6 and 7, the invention further relates to an electromechanical braking system for at least one railway vehicle including a service and emergency braking actuator 400, 500 made according to one of the previous embodiments.

In a first embodiment of an electromechanical braking system for at least one railway vehicle there is a single safety unit and a single control unit for service braking which controls several electromechanical modules according to an emergency braking value calculated therefrom. In this embodiment, the safety unit 401, 501, 601 is further arranged to emit a second emergency braking control signal 602. The electromechanical braking system for at least one railway vehicle comprises:

a second electromechanical module for generating a second braking force, the second electromechanical module being arranged to receive a second braking force control signal 660, 661, 662, 663 and to generate the second braking force, the value of which is a function of said second braking force control signal 660, . . . , 663;

second force sensor means arranged to measure said second braking force generated by said second electromechanical module and to generate a second electrical signal indicative of braking force 640, 641, 642, 643, the value of which is indicative of the value of said second braking force;

second emergency braking energy storage means arranged to store a quantity of energy sufficient to actuate the at least one emergency braking;

second means for releasing the emergency braking energy.

The second emergency braking energy release means are arranged for:
preventing the second emergency braking energy storage means from releasing the stored energy when the second emergency braking control signal 602 does not indicate to release the stored energy;
allowing the second emergency braking energy storage means to release the stored energy to actuate the at least one emergency braking when said second emergency braking control signal 602 indicates to release the stored energy to actuate the at least one emergency braking.

The first control unit for service braking 202 is further arranged for:
controlling said second electromechanical module via the second braking force control signal 660, ..., 663 to generate the second braking force having a value corresponding to said service braking force value when said electrical emergency braking request signal 210 does not indicate an emergency braking request;
controlling said second electromechanical module via the second braking force control signal 660, ..., 663, to generate the second braking force having a value corresponding to said emergency braking force value when said electrical emergency braking request signal 210 indicates an emergency braking request.

The safety unit 401, 501, 601 is further arranged for:
receiving and monitoring the second electrical signal indicative of braking force 640, ..., 643;
adjusting the second emergency braking control signal 602 so as to indicate to the second emergency braking energy release means not to release the stored energy when the emergency braking request signal 210 does not indicate an emergency braking request or when the emergency braking request signal 210 indicates an emergency braking request and the second electrical signal indicative of braking force 640, ..., 643 indicates, within a predetermined maximum delay time, a force value coinciding with the additional emergency braking force value calculated by said safety unit 401, 501 or a force value which falls, within a predetermined maximum delay time, in a predetermined tolerance range including said additional emergency braking force value calculated by said safety unit 401, 501, 601;
adjusting the second emergency braking control signal 602 so as to indicate to the second emergency braking energy release means to release the energy stored in the second emergency braking energy storage means when the emergency braking request signal 210 indicates an emergency braking request and the second electrical signal indicative of braking force 640, ..., 643 does not indicate, within a predetermined maximum delay time, a force value coinciding with the further emergency braking force value calculated by said safety unit 401, 501, 601 or a force value that does not fall, within a predetermined maximum delay time, in a predetermined tolerance range including said further emergency braking force value calculated by said safety unit 401, 501, 601.

In a second embodiment of an electromechanical braking system for at least one railway vehicle there is a single safety unit and several control units for service braking which control respective electromechanical modules according to respective emergency braking values calculated therefrom. In this embodiment, the safety unit 401, 501, 601 is further arranged to emit a second emergency braking control signal 602. The electromechanical braking system for at least one railway vehicle comprises:
a second electromechanical module for generating a second braking force, the second electromechanical module being arranged to receive a second braking force control signal and to generate the second braking force, the value of which is a function of said second braking force control signal;
a second control unit for service braking arranged for:
receiving the electrical service braking request signal 203, the electrical emergency braking request signal 210;
calculating a second service braking force value as a function of the electrical service braking request signal 203;
controlling said second electromechanical module via the second braking force control signal 660, ..., 663 to generate the second braking force having a value corresponding to said second service braking force value when said electrical emergency braking request signal 210 does not indicate an emergency braking request;
calculating a second emergency braking force value as a function of the predetermined emergency deceleration value; and
controlling said second electromechanical module via the second braking force control signal 660, ..., 663, to generate the second braking force having a value corresponding to said second emergency braking force value when said electrical emergency braking request signal 210 indicates an emergency braking request;
second force sensor means arranged to measure said second braking force generated by said second electromechanical module and to generate a second electrical signal indicative of braking force 640, ..., 643, the value of which is indicative of the value of said second braking force;
second emergency braking energy storage means arranged to store a quantity of energy sufficient to actuate the at least one emergency braking;
second means for releasing the emergency braking energy.

The second emergency braking energy release means arranged for:
preventing the second emergency braking energy storage means from releasing the stored energy when the second emergency braking control signal 602 does not indicate to release the stored energy;
allowing the second emergency braking energy storage means 208, 304 to release the stored energy to actuate the at least one emergency braking when said second emergency braking control signal 602 indicates to release the stored energy to actuate the at least one emergency braking.

The safety unit 401, 501, 601 is further arranged for:
receiving and monitoring the second electrical signal indicative of braking force 640, ..., 643;
adjusting the second emergency braking control signal 402, 502 so as to indicate to the second emergency braking energy release means not to release the stored energy when the emergency braking request signal 210 does not indicate an emergency braking request or when the emergency braking request signal 210 indicates a request for an emergency braking and the second electrical signal indicative of braking force 640, ..., 643 indicates, within a predetermined maximum delay time, a force value coinciding with the further emergency braking force value calculated by said safety unit 401, 501, 601 or a force value which falls, within a predetermined maximum delay time, in a predetermined tolerance range including said further emergency braking force value calculated by said safety unit 401, 501, 601;

adjusting the second emergency braking control signal 602 so as to indicate to the second emergency braking energy releasing means to release the energy stored in the second emergency braking energy storage means 208, 304 when the emergency braking request signal 210 indicates an emergency braking request and the second electrical signal indicative of braking force 640, . . . , 643 does not indicate, within a predetermined maximum delay time, a force value coinciding with the further emergency braking force value calculated by said safety unit 401, 501, 601 or a force value that does not fall, within a predetermined maximum delay time, in a predetermined tolerance range including said further emergency braking force value calculated by said safety unit 401, 501, 601.

In a third embodiment of an electromechanical braking system for at least one railway vehicle there is a single safety unit and a single service braking control unit which control several electromechanical modules according to an emergency braking value calculated and transmitted by the safety unit. In this embodiment, the safety unit 401, 501, 601 is further arranged to emit a second emergency braking control signal 602.

The electromechanical braking system for at least one railway vehicle comprises:

a second electromechanical module for generating a second braking force, wherein the second electromechanical module is arranged for receiving a second braking force control signal 660, . . . , 663 and generating the second braking force, the value of which is a function of said second braking force control signal 660, . . . , 663;

second force sensor means arranged for measuring said second braking force generated by said second electromechanical module and generating a second electrical signal indicative of braking force 640, . . . , 643, the value of which is indicative of the value of said second braking force;

second emergency braking energy storage means arranged for storing a quantity of energy sufficient to actuate the at least one emergency braking;

second means for releasing the emergency braking energy.

The second emergency braking energy release means are arranged for:

preventing the second emergency braking energy storage means from releasing the stored energy when the second emergency braking control signal 602 does not indicate to release the stored energy;

allowing the second emergency braking energy storage means 208, 304 to release the stored energy to actuate the at least one emergency braking when said second emergency braking control signal 602 indicates to release the stored energy to actuate the at least one emergency braking.

The first control unit for service braking 202 is further arranged for:

controlling said second electromechanical module via the second braking force control signal 660, . . . , 663 to generate the second braking force having a value corresponding to said service braking force value when said electrical emergency braking request signal 210 does not indicate an emergency braking request;

controlling said second electromechanical module via the second braking force control signal 660, . . . , 663 to generate the second braking force having a value corresponding to said emergency braking force value which the first control unit for the service braking has received from the safety unit 401, 501 via said first electrical emergency braking force request signal 403, 503 when the emergency braking request signal 210 indicates an emergency braking request.

The safety unit 401, 501 is further arranged for:

receiving and monitoring the second electrical signal indicative of braking force 640, . . . , 643;

adjusting the second emergency braking control signal 402, 502 so as to indicate to the second emergency braking energy release means not to release the stored energy when the emergency braking request signal 210 does not indicate an emergency braking request or when the emergency braking request signal 210 indicates an emergency braking request and the second electrical signal indicative of braking force 640, . . . , 643 indicates, within a predetermined maximum delay time, a force value coinciding with the emergency braking force value calculated by said safety unit 401, 501, 601 or a force value which falls, within a predetermined maximum delay time, in a predetermined tolerance range including said emergency braking force calculated by said safety unit 401, 501, 601;

adjusting the second emergency braking control signal 602 so as to indicate to the second emergency braking energy release means to release the energy stored in the second emergency braking energy storage means when the emergency braking request signal 210 indicates a request for an emergency braking and the second electrical signal indicative of braking force 640, . . . , 643 does not indicate, within a predetermined maximum delay time, a force value coinciding with the braking force value calculated by said safety unit 401, 501, 601 or a force value that does not fall, within a predetermined maximum delay time, in a predetermined tolerance range including said emergency braking force value calculated by said emergency braking force safety unit 401, 501, 601.

In a fourth embodiment of an electromechanical braking system for at least one railway vehicle there is a single safety unit and several control units for service braking which control respective electromechanical modules according to a further emergency braking value calculated and transmitted from the safety unit. In this embodiment, said safety unit 401, 501, 601 is further arranged to send the value of the emergency braking force, calculated by the safety unit 401, 501, 601, to a second control unit for service braking via a second electrical emergency braking force request signal and to emit a second emergency braking control signal 602.

The electromechanical braking system for at least one railway vehicle comprises:

a second electromechanical module for the generation of a second braking force, the second electromechanical module being arranged to receive a second braking force control signal 660, . . . , 663 and to generate the second braking force, the value of which is a function of said second braking force control signal 660, . . . , 663;

second force sensor means arranged to measure said second braking force generated by said second electromechanical module and to generate a second electrical signal indicative of braking force 640, the value of which is indicative of the value of said second braking force;

second emergency braking energy storage means arranged to store a quantity of energy sufficient to actuate the at least one emergency braking;

second means for releasing the emergency braking energy.

The second emergency braking energy release means are arranged for:

preventing the second emergency braking energy storage means from releasing the stored energy when the second emergency braking control signal 602 does not indicate to release the stored energy;

allowing the second emergency braking energy storage means 208, 304 to release the stored energy to actuate the at least one emergency braking when said second emergency braking control signal 602 indicates to release the stored energy to actuate the at least one emergency braking.

The second control unit for service braking is arranged for:

receiving the electrical service braking request signal 203, the electrical emergency braking request signal 210;

calculating a second service braking force value as a function of the electrical service braking request signal 203;

controlling said second electromechanical module via the second braking force control signal 660, . . . , 663 to generate the second braking force having a value corresponding to said second service braking force value when said electrical emergency braking request signal 210 does not indicate an emergency braking request;

controlling said second electromechanical module via the second braking force control signal 660, . . . , 663 to generate the second braking force having a value corresponding to said emergency braking force value which the second service braking control unit has received from the safety unit 401, 501, 601 via said second electrical emergency braking force request signal when the emergency braking request signal 210 indicates an emergency braking request.

The safety unit 401, 501, 601 is further arranged for:

receiving and monitoring the second electrical signal indicative of braking force 640, . . . , 643;

adjusting the second emergency braking control signal 402, 502 so as to indicate to the second emergency braking energy release means not to release the stored energy when the emergency braking request signal 210 does not indicate an emergency braking request or when the emergency braking request signal 210 indicates an emergency braking request and the second electrical signal indicative of braking force 640, . . . , 643 indicates, within a predetermined maximum delay time, a force value coinciding with the emergency braking force value calculated by said safety unit 401, 501 or a force value which falls, within a predetermined maximum delay time, in a predetermined tolerance range including said emergency braking force value calculated by said safety unit 401, 501, 601;

adjusting the second emergency braking control signal 602 so as to indicate to the second emergency braking energy release means to release the energy stored in the second emergency braking energy storage means when the emergency braking request signal 210 indicates a request for an emergency braking and the second electrical signal indicative of braking force 640, . . . , 643 does not indicate, within a predetermined maximum delay time, a force value coinciding with the braking force value calculated by said safety unit 401, 501, 601 or a force value that does not fall, within a predetermined maximum delay time, in a predetermined tolerance range including said emergency braking force value calculated by said emergency braking force safety unit 401, 501, 601.

For any previously described embodiment of the electromechanical service and emergency braking actuator or the electromechanical braking system, the first service braking control unit 202 may be arranged to receive the first electrical signal of actual braking force 213. For example, this may be used by the first service braking control unit 202 to check that in the event of a service braking the braking force corresponding to the service braking force request 203 has been reached. The first service braking control unit 202 will be able to control the first electromechanical module 210 so as to adjust the first braking force until the first electrical signal of actual braking force 213 has indicated that the first braking force corresponds substantially to the service braking force request 203.

Clearly, the first service braking control unit 202 may also be arranged to receive the second electrical signal of actual braking force 640, . . . , 643 (when present). For example, this may be used by the first service braking control unit 202 to check that in the event of a service braking the braking force corresponding to the service braking force request 203 has been reached. The first service braking control unit 202 will be able to control the second electromechanical module in order to adjust the second braking force until the second electrical signal of actual braking force 640, . . . , 643 indicates that the second braking force corresponds substantially to the service braking force request 203.

Clearly, when present, the second control unit for service braking may also receive the second electrical signal of actual braking force 640, . . . , 643. For example, this may be used by the second control unit for service braking 202 to check that in the event of a service braking the braking force corresponding to the service braking force request 203 has been reached. The second control unit for service braking will be able to control the second electromechanical module in order to adjust the second braking force until the second electrical signal of actual braking force 640, . . . , 643 indicates that the second braking force corresponds substantially to the service braking force request 203.

Various aspects and embodiments of an electromechanical service and emergency braking actuator for a railway vehicle and an electromechanical braking system for at least one railway vehicle according to the invention have been described. It is understood that each embodiment may be combined with any other embodiment. Furthermore, the invention is not limited to the described embodiments, but may be varied within the scope defined by the appended claims.

The invention claimed is:

1. A electromechanical service and emergency braking actuator for a railway vehicle comprising:
   a first electromechanical module for generating a first braking force, the first electromechanical module being arranged for receiving a first braking force control signal and for generating a first braking force, the value of which is a function of said first braking force control signal;
   first force sensor means arranged for measuring said first braking force generated by said first electromechanical module and for generating a first electrical signal of actual braking force, the value of which is indicative of the value of said first braking force;

first emergency braking energy storage means arranged for storing a sufficient amount of energy to actuate at least one emergency braking;

a safety unit arranged for emitting a first emergency braking control signal;

first emergency braking energy release means arranged for:
preventing the first emergency braking energy storage means from releasing the stored energy when the first emergency braking control signal does not indicate to release the energy stored in the first emergency braking energy storage means;
allowing the first emergency braking energy storage means to release the stored energy to actuate the at least one emergency braking when said first emergency braking control signal indicates to release the energy stored in the first emergency braking energy storage means to carry out the at least one emergency braking;

a first service braking control unit arranged for:
receiving an electrical service braking request signal, an electrical emergency braking request signal;
calculating a service braking force value as a function of the electrical service braking request signal;
controlling said first electromechanical module via the first braking force control signal to generate the first braking force having a value corresponding to said service braking force value when said electrical emergency braking request signal does not indicate an emergency braking request;
calculating an emergency braking force value based on a predetermined emergency deceleration value; and
controlling said first electromechanical module via the first braking force control signal, to generate the first braking force having a value corresponding to said emergency braking force value when said first electrical emergency braking request signal indicates an emergency braking request;

wherein the safety unit is also arranged for:
receiving the emergency braking request signal;
receiving and monitoring the first electrical signal of actual braking force;
calculating an additional emergency braking force value as a function of the predetermined emergency deceleration value;
adjusting the first emergency braking control signal so as to indicate to the first emergency braking energy release means not to release the energy stored in the first emergency braking energy storage means when the emergency braking request signal does not indicate an emergency braking request or when the emergency braking request signal indicates an emergency braking request and the first electrical signal of actual braking force indicates, within a predetermined maximum delay time, a force value coinciding with the additional emergency braking force value calculated by said safety unit, or a force value that falls, within a predetermined maximum delay time, in a predetermined tolerance range including said additional emergency braking force value calculated by said safety unit;
adjusting the first emergency braking control signal so as to indicate to the first emergency braking energy release means to release the energy stored in the first emergency braking energy storage means when the emergency braking request signal indicates an emergency braking request and the first electrical signal of actual braking force does not indicate, within a predetermined maximum delay time, a force value coinciding with the additional emergency braking force value calculated by said safety unit, or a force value that does not fall, within a predetermined maximum delay time, in a predetermined tolerance range including said additional emergency braking force value calculated by said safety unit.

2. The electromechanical service and emergency braking actuator according to claim 1, wherein the service braking control unit is arranged for controlling the first electromechanical module via the first braking force control signal so as to generate the first braking force having the value corresponding to the greater of the service braking force value calculated by the first service braking control unit and the emergency braking force value calculated by the first service braking control unit;

wherein when the service braking force value calculated by the first service braking control unit is greater than the emergency braking force value calculated by the first service braking control unit, the safety unit is arranged for adjusting the first emergency braking control signal so as to indicate to the first emergency braking energy release means not to release the energy stored in the first emergency braking energy storage means, even if the emergency braking request signal indicates an emergency braking request and the first electrical signal of actual braking force indicates, within a predetermined maximum delay time, a force value higher than the additional emergency braking force value calculated by said safety unit, or a force value which is greater than a higher end value of said predetermined tolerance range including said additional emergency braking force value calculated by said safety unit.

3. The electromechanical service and emergency braking actuator according to claim 1, wherein said first service braking control unit is also arranged for:
receiving a weight signal indicative of the weight of a bogie of the railway vehicle or of the railway vehicle;
calculating the service braking force value as a function of the electrical service braking request signal and the weight signal;
calculating the emergency braking force value based on the predetermined emergency deceleration value and the weight signal;
said safety unit is also arranged for:
calculating the additional emergency braking force value as a function of the predetermined emergency deceleration value and the weight signal.

4. An electromechanical service and emergency braking actuator for a railway vehicle comprising:
a first electromechanical module for generating a first braking force, arranged for receiving at least a first braking force control signal and for generating a first braking force as a function of said first braking force control signal;
first force sensor means arranged for measuring said first braking force generated by said first electromechanical module and for generating a first electrical signal of actual braking force, the value of which is indicative of the value of said first braking force;
first emergency braking energy storage means arranged for storing a sufficient amount of energy to actuate at least one emergency braking;

a safety unit arranged for:
  receiving an emergency braking request signal;
  calculating an emergency braking force value as a function of a predetermined emergency deceleration value;
  sending the emergency braking force value, calculated by the safety unit, to a first service braking control unit via a first electrical emergency braking force request signal; and
  emitting a first emergency braking control signal;
first emergency braking energy release means arranged for:
  preventing the first emergency braking energy storage means from releasing the stored energy when the first emergency braking control signal does not indicate to release the energy stored in the first emergency braking energy storage means;
  allowing the first emergency braking energy storage means to release the stored energy to actuate the at least one emergency braking when said first emergency braking control signal indicates to release the energy stored in the first emergency braking energy storage means to actuate the at least one emergency braking;
said first service braking control unit, arranged for:
  receiving an electrical service braking request signal and an electrical emergency braking request signal;
  calculating a service braking force value as a function of the electrical service braking request signal;
  controlling said first electromechanical module, via the first braking force control signal, to generate the first braking force having a value corresponding to said service braking force value when said electrical emergency braking request signal does not indicate an emergency braking request;
  controlling said first electromechanical module, via the first braking force control signal, to generate the first braking force having a value corresponding to said emergency braking force value that the first service braking control unit received from the safety unit through said first electrical emergency braking force request signal when the emergency braking request signal indicates an emergency braking request;
wherein, the safety unit is arranged for:
  receiving and monitoring the first electrical signal of actual braking force;
  adjusting the first emergency braking control signal so as to indicate to the first emergency braking energy release means not to release the energy stored in the first emergency braking energy storage means when the emergency braking request signal does not indicate an emergency braking request or when the emergency braking request signal indicates an emergency braking request and the first electrical signal of actual braking force indicates, within a predetermined maximum delay time, a force value coinciding with the emergency braking force value calculated by said safety unit, or a force value that falls, within a predetermined maximum delay time, in a predetermined tolerance range including said emergency braking force value calculated by said safety unit;
  adjusting the first emergency braking control signal so as to indicate to the first emergency braking energy release means to release the energy stored in the first emergency braking energy storage means when the emergency braking request signal indicates an emergency braking request and the first electrical signal of actual braking force does not indicate, within a predetermined maximum delay time, a force value coinciding with the emergency braking force value calculated by said safety unit, or a force value that does not fall, within a predetermined maximum delay time, in a predetermined tolerance range including said emergency braking force value calculated by said safety unit.

5. The electromechanical service and emergency braking actuator according to claim 4, wherein said first service braking control unit is also arranged for:
  receiving a weight signal indicative of the weight of a bogie of the railway vehicle or of the railway vehicle;
  calculating the service braking force value as a function of the electrical service braking request signal and the weight signal;
and said safety unit is also arranged for:
  receiving the weight signal;
  calculating the emergency braking force value as a function of the predetermined emergency deceleration value and the weight signal.

6. The electromechanical service and emergency braking actuator according to claim 5, wherein the first service braking control unit is arranged for controlling the first electromechanical module via the first braking force control signal so as to generate the greater of the service braking force value calculated by the first service braking control unit and the emergency braking force value transmitted to the first service braking control unit by the safety unit;
  wherein when the service braking force value calculated by the first service braking control unit is greater than the emergency braking force value received by the first service braking control unit, the safety unit is arranged for adjusting the first emergency braking control signal so as to indicate to the first emergency braking energy release means not to release the energy stored in the first emergency braking energy storage means, even if the emergency braking request signal indicates an emergency braking request and the first electrical signal of actual braking force indicates, within a predetermined maximum delay time, a force value higher than the emergency braking force value calculated by said safety unit, or a force value which is greater than a higher end value of said predetermined tolerance range including said emergency braking force value calculated by said safety unit.

7. The electromechanical service and emergency braking actuator according to claim 6, wherein the safety unit is arranged for: sending a null emergency braking force value to the first service braking control unit via the first electrical emergency braking force request signal when the emergency braking request signal does not indicate the request for emergency braking.

8. The electromechanical service and emergency braking actuator according to claim 1, wherein said electromechanical service and emergency braking actuator comprises an integrated module including at least the first electromechanical module, the first force sensor means, the first emergency braking energy storage means, the first emergency braking energy release means, the first service braking control unit, the safety unit.

9. The electromechanical service and emergency braking actuator according to claim 1, wherein said electromechanical service and emergency braking actuator comprises an integrated module including the first electromechanical module, the first force sensor means, the first emergency braking energy storage means, the first emergency braking energy release means, the first service braking control unit;

wherein the safety unit is external to said integrated module.

10. The electromechanical service and emergency braking actuator according to claim 1, wherein said electromechanical service and emergency braking actuator comprises an integrated module including the first electromechanical module, the first force sensor means, the first emergency braking energy storage means and the first emergency braking energy release means;
wherein the safety unit and the first service braking control unit are external to said integrated module.

11. The electromechanical service and emergency braking actuator according to claim 1, wherein the first braking force generated by the first electromechanical module is arranged to be transmitted to braking means, through mechanical transmission means.

12. The electromechanical service and emergency braking actuator according to claim 11, wherein the braking means comprise at least one disc friction pad or wheel friction block.

13. The electromechanical service and emergency braking actuator according to claim 1, wherein the first emergency braking energy storage means comprises a mechanical means for storing potential mechanical energy.

14. The electromechanical service and emergency braking actuator according to claim 1, wherein the first emergency braking energy storage means comprise mechanical means for storing kinetic energy.

15. The electromechanical service and emergency braking actuator according to claim 1, wherein the first emergency braking energy storage means comprises mechanical means for storing electric energy.

16. The electromechanical service and emergency braking actuator according to claim 1, wherein the safety unit has a safety integrity level, SIL, higher than the safety integrity level, SIL, of the first service braking control unit.

17. The electromechanical service and emergency braking actuator according to claim 1, wherein the safety unit has the safety integrity level SIL≥3.

18. The electromechanical service and emergency braking actuator according to claim 1, wherein the safety unit is made according to an architecture including at least one microprocessor.

19. The electromechanical service and emergency braking actuator according to claim 1, wherein the safety unit is made according to an architecture including at least one programmable device.

20. The electromechanical service and emergency braking actuator according to claim 1, wherein the predetermined emergency deceleration value is provided to the first service braking control unit and/or to the safety unit via an electrical signal.

* * * * *